(12) United States Patent
Miller et al.

(10) Patent No.: US 6,767,010 B2
(45) Date of Patent: Jul. 27, 2004

(54) SUSPENSION STRUT WITH VERTICALLY ADJUSTABLE SPRING PERCH

(75) Inventors: Alexander Miller, Würzburg (DE); Klaus Stretz, Haßfurt (DE); Michael Hurrlein, deceased, late of Hammelberg (DE), by Gabriela Hurrlein, legal representative; Manfred Schuler, Dittelbrunn (DE)

(73) Assignee: ZF Sachs AG, Schweinfurt (DE)

(*) Notice: Subject to any disclaimer, the term of this patent is extended or adjusted under 35 U.S.C. 154(b) by 0 days.

(21) Appl. No.: 10/229,500

(22) Filed: Aug. 28, 2002

(65) Prior Publication Data

US 2003/0047399 A1 Mar. 13, 2003

(30) Foreign Application Priority Data

Sep. 8, 2001 (DE) .......................................... 101 44 163

(51) Int. Cl.⁷ ................................................. F16F 1/06
(52) U.S. Cl. ........................ 267/170; 267/220; 267/177; 188/322.19; 280/124.151
(58) Field of Search ...................... 158/322.19; 217/170, 217/175, 177, 179, 220, 221, 286, 219; 280/124.151, 124.146; 277/650, 933

(56) References Cited

U.S. PATENT DOCUMENTS

| | | | | |
|---|---|---|---|---|
| 4,366,969 A | * | 1/1983 | Benya et al. ................ 267/221 |
| 4,683,993 A | * | 8/1987 | Tanabe et al. .......... 188/321.11 |
| 4,817,928 A | * | 4/1989 | Paton .......................... 267/219 |
| 5,249,781 A | * | 10/1993 | Wohler ........................ 267/170 |
| 5,480,128 A | | 1/1996 | Cotter ..................... 267/64.11 |
| 5,553,713 A | * | 9/1996 | Sydekum et al. ........... 267/221 |
| 5,775,720 A | * | 7/1998 | Kmiec et al. .......... 188/322.15 |
| 6,293,533 B1 | * | 9/2001 | Sasse ......................... 267/221 |

FOREIGN PATENT DOCUMENTS

| | | | | |
|---|---|---|---|---|
| DE | 85 10 058 | | 8/1985 | .......... B60G/15/06 |
| DE | 197 44 757 | | 4/1999 | ......... B60G/17/027 |
| DE | 198 51 019 | | 6/2000 | ............. F16F/1/12 |

* cited by examiner

Primary Examiner—Matthew C. Graham
Assistant Examiner—Mariano Sy
(74) Attorney, Agent, or Firm—Cohen, Pontani, Lieberman & Pavane

(57) ABSTRACT

Suspension strut comprising a cylinder and a spring perch which is axially displaceable relative to the cylinder for adjustment of the position, wherein the spring perch has a sleeve portion by which the connection to the cylinder is carried out. A chamber is arranged on the cylinder side which is at least partly filled with a moldable material. The sleeve portion contacts the moldable material, which in a solid state transmits a supporting force from the cylinder to the spring perch.

12 Claims, 4 Drawing Sheets

SUSPENSION STRUT WITH VERTICALLY ADJUSTABLE SPRING PERCH

BACKGROUND OF THE INVENTION

1. Field of the Invention

The invention is directed to a suspension strut including a cylinder and a vertically adjustable spring perch having a sleeve portion which is connected to the cylinder.

2. Description of the Related Art

DE 85 10 058 U1 discloses a suspension strut with a removable spring perch which is supported in a holder ring. The holder ring can be fastened to the cylinder of the suspension strut independent from the spring perch and coated as a component unit. The vertical adjustment of the spring perch is determined by the holder ring and can not be altered.

DE 198 51 019 C1 discloses a suspension strut whose cylinder has a holding ring for a fixedly adjustable spring perch. At least one groove is shaped into the holding ring, wherein a circumferential area of a sleeve portion of the spring perch can be deformed radially in this groove. The overlapping of the sleeve portion with the groove defines the maximum vertical adjustment of the spring perch.

Further, a spring unit for motor vehicles is known from DE 197 44 757 A1, wherein the height position of a spring perch is actively adjustable through the use of a hydraulic medium. A spring unit of this kind is provided particularly for raised vehicles in which it is necessary to adjust the spring perch frequently in connection with a height control of the vehicle body.

SUMMARY OF THE INVENTION

It is the object of the present invention to provide a suspension strut with a vertically adjustable spring perch, particularly relating to lasting vertical adjustment.

According to the invention, a chamber is arranged on the cylinder side which is at least partly filled with a moldable material, the sleeve portion contacts the moldable material, which transmits a supporting force from the cylinder to the spring perch in the solid state.

Both plastic and metallic materials can be used as moldable material. During vertical adjustment, the spring perch is held in its predetermined position and the chamber is filled with an appropriate amount of moldable material.

For this purpose, the cylinder-side chamber can be formed by a supporting ring which is axially fixedly connected to the cylinder.

In another advantageous construction, the supporting ring has a sleeve and a base and the sleeve portion is held at least partly within the sleeve of the supporting ring. In this variant, the supporting ring forms the chamber for the moldable material.

With regard to good accessibility for a corresponding device, the supporting ring has a connection opening for the moldable material.

In case of special installation space conditions, it may be necessary that the supporting ring has only a very small outer diameter. For such cases, the supporting ring determines the chamber for the moldable material with a mold sleeve of a device. After the material is fed into the chamber, the mold sleeve can be removed.

When a supporting ring with very simple geometry is required, the sleeve portion of the spring perch can be constructed in such a way that it surrounds the supporting ring radially. In the simplest case, the supporting ring can be formed by a disk.

In an advantageous further development, the sleeve portion has deformations which are oriented radially inward. These deformations serve to improve the axial connection between the moldable material and the sleeve portion, but offer the additional advantage that a safety stop is achieved for the spring perch with suitable dimensioning of the deformations in relation to the outer diameter of the supporting ring.

In a constructional variant, the chamber is formed at least partly by a radial shaped portion of the cylinder. Depending on the available shaping devices, a radial inner or radial outer shaped portion of the cylinder can be provided. Finally, the partial difference between a nominal diameter and the shaped portion diameter is used determine a chamber.

Depending on the selected material, it can be useful for the sleeve portion to have a radial outward shaped wall area which defines the chamber. This variant is usable particularly with metallic moldable material.

Further, a safety stop can be arranged on the cylinder side for the spring perch.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
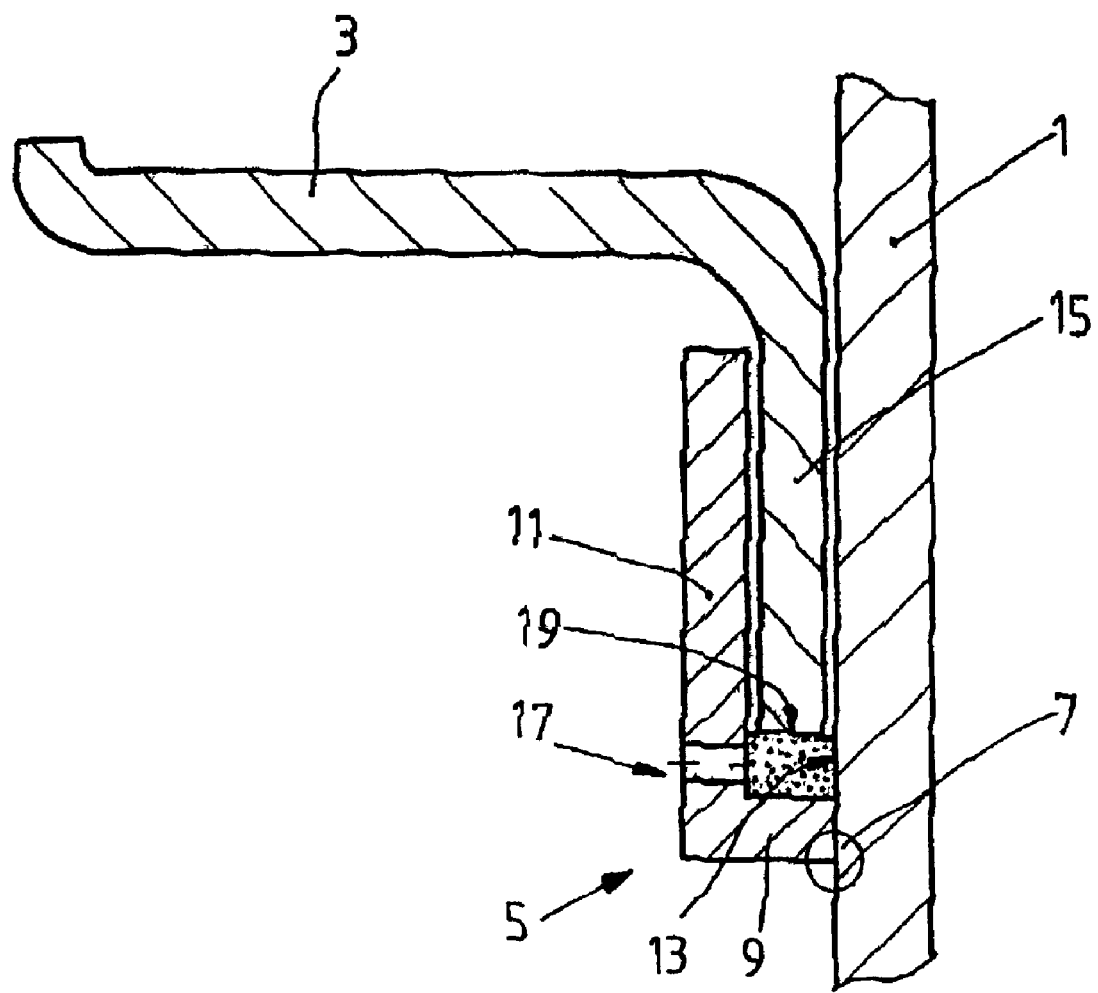
FIG. 1 is a partial axial section showing a first embodiment wherein a supporting ring is fixed to a cylinder plate.

FIG. 1 shows only a portion of a cylinder 1 carrying a spring perch 3. The cylinder can be part of a vibration damper or gas spring. A piston can be arranged inside the cylinder so as to be axially movable or a coaxial pressure tube enclosing a work medium can be arranged in the cylinder.

A supporting ring 5 is fastened on the cylinder side by any of a variety of possible fastening means. A retaining ring 7 is shown in the drawing, but a weld could also be used as an alternative. The supporting ring 5 comprises a base 9 and a sleeve 11, so that the supporting ring, together with the cylinder, forms an annular chamber. A lower end of a sleeve portion 15 of the spring perch 3 is arranged inside this chamber and is guided therein so as to be axially displaceable. The chamber 13 is filled with a moldable material at least up to the lower end face 19 of the sleeve portion 15 via a connection opening 17 in the supporting ring. Liquid plastics or metallic, curable materials can be used as moldable materials.

When the cylinder 1 is a component of a vibration damper, a holding device, not shown, is attached, for example, to the spring perch 3 at the end of the vehicle assembly for horizontal alignment of the vehicle. In so doing, the sleeve portion of the spring perch is displaced inside the chamber. When the predetermined vertical adjustment is achieved, the chamber is filled with the moldable material at least up to the lower end face of the sleeve portion. As soon as the moldable material has hardened sufficiently, the holding device can be removed and the vehicle has accordingly been made horizontal regardless of specific outfitting.

Figure 2:
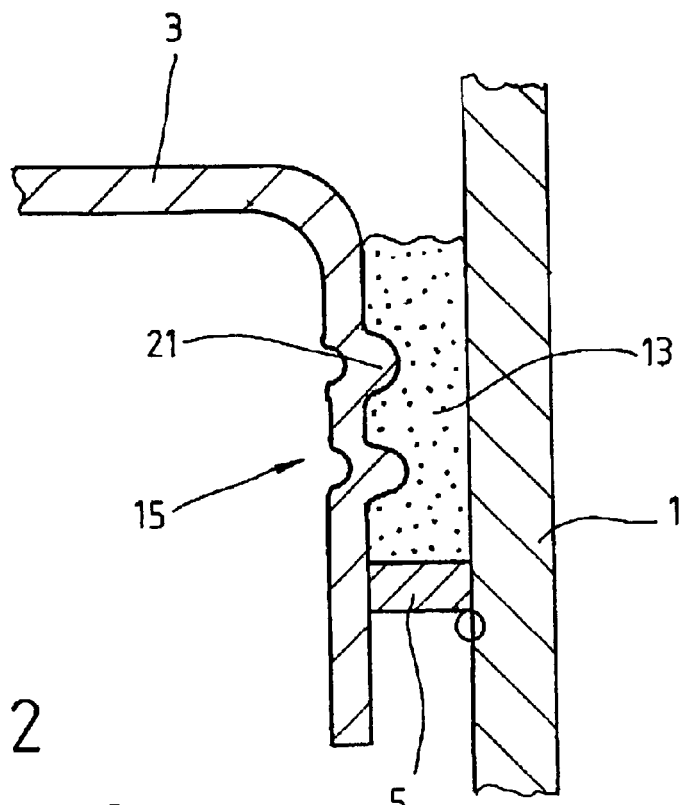
FIG. 2 is a partial axial section of a second embodiment wherein a supporting ring is fixed to a cylinder plate.

FIG. 2 shows a variant in which the supporting ring 5 is formed by a simple plane disk. The sleeve portion 15 of the spring perch 3 encloses the supporting ring 5 on the radial outside and accordingly determines the chamber 13 which is to be filled with the moldable material. At least one deformation 21 which is directed radially inward is formed in the sleeve portion 15 and engages in a positive-locking connection with the moldable material. The diameter of the deformation is less than an outer diameter of the supporting ring 5 such that the deformation 21 functions as a stop on the supporting ring 5 in case of shearing of the deformation with the moldable material inside the chamber.

Figure 3:
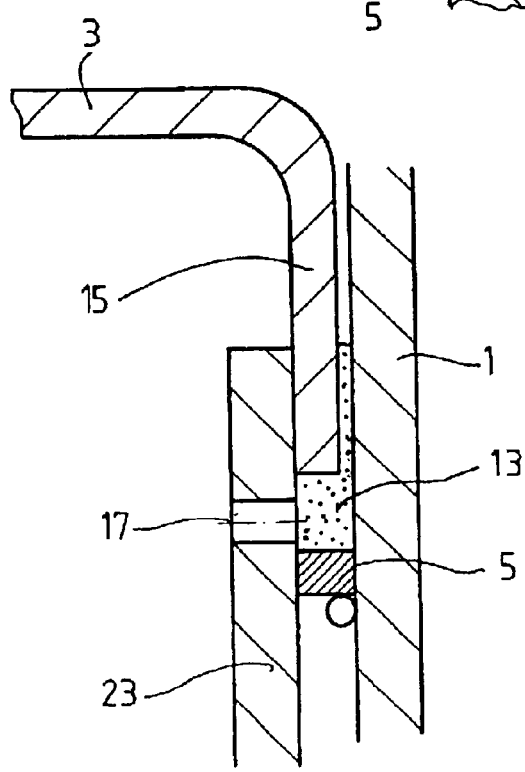
FIG. 3 is a partial axial section of a third embodiment wherein a supporting ring is fixed to a cylinder plate.

It is clear from FIG. 3 that the invention can also be used under very limited radial installation conditions. A supporting ring 5 in the structural shape of a disk is again used, but the sleeve portion 15 extends within the circular area defined by the supporting ring 5. Together with the supporting ring, a mold sleeve 23 of a device which is not shown in more detail forms the chamber 13 to be filled with moldable material. After the curing process, the device can be removed. If the moldable material effectively detaches from the sleeve portion of the spring perch 3, the end face 19 of the sleeve portion 15 can be supported on the supporting ring 5.

Figure 4:
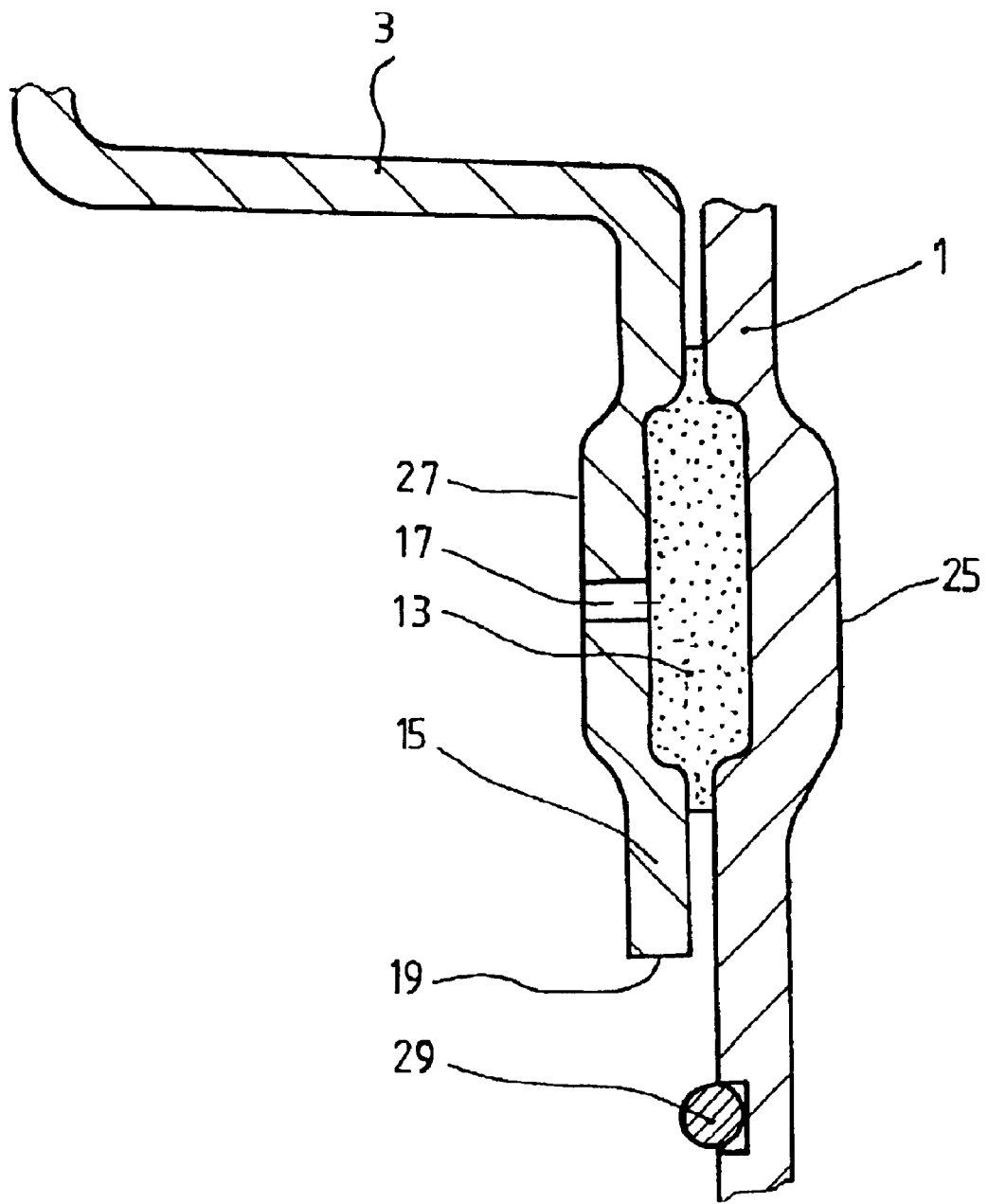
FIG. 4 is a partial axial section of a fourth embodiment utilizing a shaped cylinder.

In the variant shown in FIG. 4, a supporting ring is omitted and, instead, there is a shaped portion 25 of the cylinder 1 which is directed radially inward and at least partly forms the chamber 13 for the moldable material. Also, the sleeve portion 15 of the spring perch 3 has been provided with a radial outer wall area 27, so that a chamber is formed having a width determined by the deformations of the parts. In addition, a safety stop 29 is provided having the structural shape of a retaining ring on which the lower end face 19 of the sleeve portion 15 can be supported. The optimum installation position of the spring perch relative to the cylinder which is shown in FIG. 4 need not be provided. Displaced positions can also be adjusted in which the parts of the sleeve portion located above and below the wall area overlap the shaped portion of the cylinder and form the chamber 13.

Figure 5:
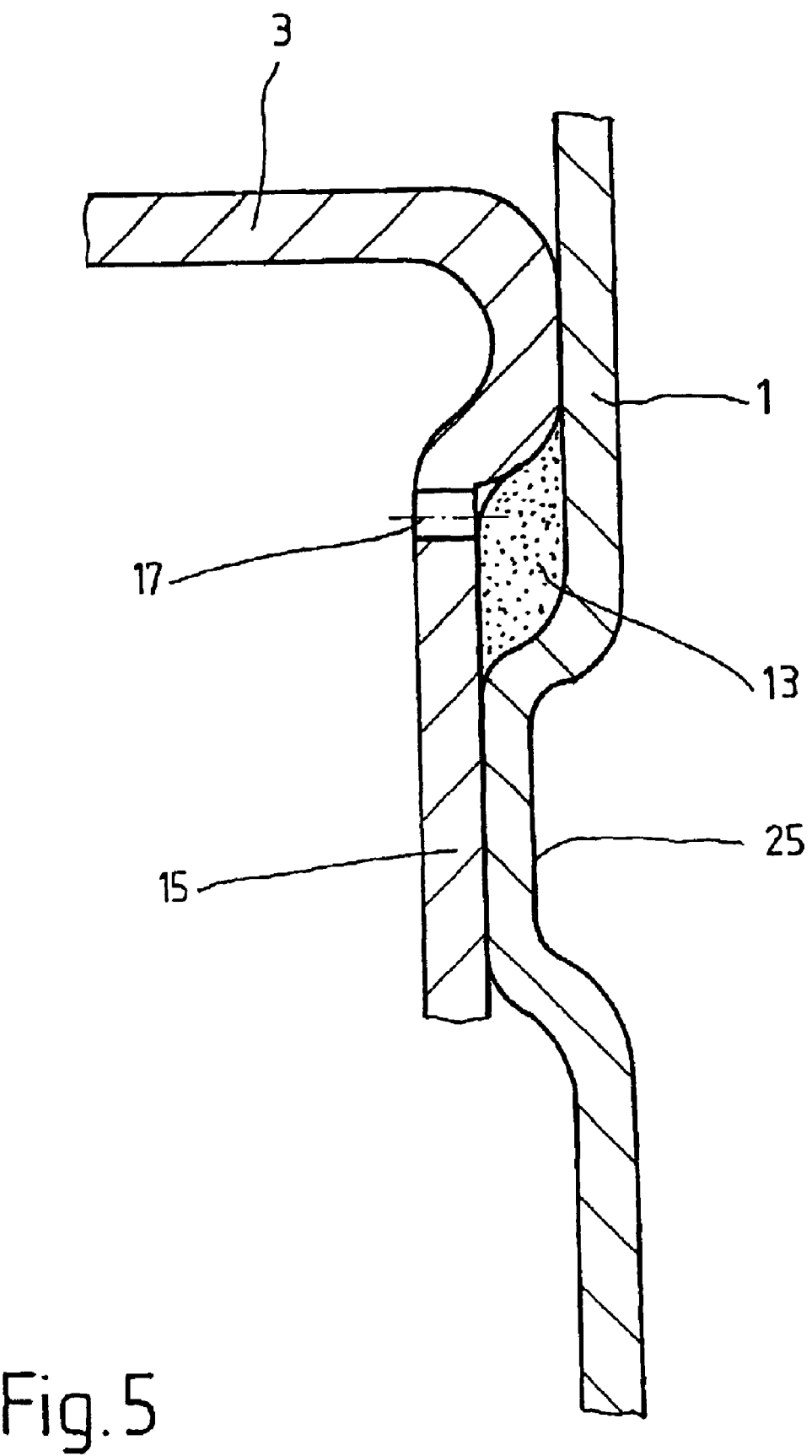
FIG. 5 is a partial axial section of a fifth embodiment utilizing a shaped cylinder.

In FIG. 5, the shaped portion 25 of the cylinder 1 is directed radially outward. The spring perch 3 has a portion of the sleeve portion 15 with a diameter which is smaller than the cylinder in the area of the shaped portion. The lower part of the sleeve portion 15 is adapted to the diameter of the shaped portion 25, so that the chamber 13 for the moldable material is determined half by the sleeve portion 15 and half by the cylinder with the radial shaped portion 25. The connection opening 17 is constructed at the upper end of the sleeve portion 15 before the transition to the part with the smaller diameter in order to achieve the largest possible adjusting area which is determined by the axial overlapping of the lower part of the sleeve portion and the upper side of the shaped portion of the cylinder.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A suspension strut comprising
   a cylinder,
   a spring perch which is axially displaceable relative to said cylinder, said spring perch having a sleeve portion which is connected to said cylinder,
   a chamber arranged against said cylinder, and
   a moldable material at least partially filling said chamber, said moldable material being set in said chamber to form a solid state and, in the solid state, contacting said sleeve portion to support said spring perch on said cylinder.

2. A suspension strut as in claim 1 further comprising a supporting ring which is axially fixed with respect to said cylinder, said chamber being bounded by said supporting ring and said cylinder.

3. A suspension strut as in claim 2 wherein said supporting ring comprises a sleeve and a base, said sleeve portion of said spring perch being held between said sleeve and said cylinder.

4. A suspension strut as in claim 2 wherein said supporting ring has an opening for injecting said moldable material into said chamber.

5. A suspension strut as in claim 2 wherein said chamber is formed by the mold sleeve of a molding device, said mold sleeve being removed when said material is in the solid state.

6. A suspension strut as in claim 2 wherein said sleeve portion surrounds said supporting ring radially.

7. A suspension strut as in claim 6 wherein said sleeve portion of said spring perch is formed with circumerential ribs which extend radially inward.

8. A suspension strut as in claim 1 wherein said cylinder comprises a radially shaped portion bounding said chamber.

9. A suspension strut as in claim 8 wherein said radially shaped portion extends radially outward from said cylinder.

10. A suspension strut as in claim 8 further comprising a safety stop arranged on said cylinder axially adjacent to said sleeve portion of said spring perch.

11. A suspension strut as in claim 1 wherein said chamber is substantially closed and comprises an opening for injecting said moldable material into said chamber.

12. A suspension strut as in claim 1 wherein said moldable material, in the solid state, fixes the spring perch against movement with respect to the cylinder.

* * * * *

UNITED STATES PATENT AND TRADEMARK OFFICE
CERTIFICATE OF CORRECTION

PATENT NO. : 6,767,010 B2
DATED : July 27, 2004
INVENTOR(S) : Alexander Miller

It is certified that error appears in the above-identified patent and that said Letters Patent is hereby corrected as shown below:

<u>Title page,</u>
Item [75], Inventors, should read:
-- Alexander Miller, Würzberg (DE); Klaus Stretz, Haßfurt (DE); Michael Hurrlein, deceased, late of hammelburg (DE), by Gabriela Hurrlein, legal representative; Manfred Schuler, Dittelbrunn (DE) --

Signed and Sealed this

Twenty-fourth Day of May, 2005

JON W. DUDAS
*Director of the United States Patent and Trademark Office*